United States Patent [19]

Menegazzo

[11] Patent Number: 5,679,417
[45] Date of Patent: Oct. 21, 1997

[54] EASILY BREAKABLE GLASS PANE FOR EMERGENCY EXITS OR THE LIKE

[75] Inventor: Zaccaria Menegazzo, Padua, Italy

[73] Assignee: S.P.S. S.p.A., Saletto, Italy

[21] Appl. No.: 545,277

[22] Filed: Oct. 19, 1995

[51] Int. Cl.⁶ .................... E06B 3/54; E06B 3/66
[52] U.S. Cl. .............. 428/14; 156/109; 428/34; 428/38; 428/43
[58] Field of Search ................ 428/14, 38, 34, 428/43; 156/109

[56] References Cited

U.S. PATENT DOCUMENTS

| | | | |
|---|---|---|---|
| 4,194,669 | 3/1980 | Bromberg | 428/38 X |
| 4,411,855 | 10/1983 | Fiebig, Jr. et al. | 428/38 X |
| 4,680,206 | 7/1987 | Yoxon et al. | 428/34 |
| 5,066,078 | 11/1991 | Wurst | 428/13 X |

*Primary Examiner*—Henry F. Epstein
*Attorney, Agent, or Firm*—Guido Modiano; Albert Josif

[57] ABSTRACT

Easily breakable glass pane for emergency exits or the like, comprising at least one first sheet that is provided with at least one hole and is joined to at least one second sheet having no holes. The pane constituted by said sheets is perimetrically shaped so that only the second sheet is mounted in a perimetric frame.

9 Claims, 1 Drawing Sheet

5,679,417

EASILY BREAKABLE GLASS PANE FOR EMERGENCY EXITS OR THE LIKE

BACKGROUND OF THE INVENTION

The present invention relates to an easily breakable glass pane for emergency exits or the like.

It is known that vehicles such as buses, trams, trains, etcetera, having many fixed glass surfaces, are equipped with tools such as pointed hammers to be used in case of emergency in order to break the glass panes.

It is known that current constructive technology uses glass panes composed of laminated sheets joined by stratified plastic films.

When the glass pane is broken with the tool, the usually tempered glass sheets form fragments but the pane remains whole due to the adhesion of the fragments and to the strength of the plastic films, so that the only way to knock them down is to deform them until their edges slide out of the frame.

This is hindered by the fact that the fragmented glass surface is sharp after breakage with the tool.

SUMMARY OF THE INVENTION

An aim of the present invention is to provide a glass pane for emergency exits or the like that can be broken easily and quickly.

Within the scope of this aim, a consequent primary object is to provide a glass pane that can be knocked down completely with a moderate effort.

Another important object is to provide a glass pane that does not form an injury hazard when it is broken by the user.

Another important object is to offer the user a product which truly puts him in an extremely relaxed mental state, since it is the optimization of the preferential safety system (breaking of glass is the most intuitive and straightforward action that a person in danger can imagine).

Another object is to provide a pane that can be manufactured with conventional equipment and systems.

This aim, these objects, and others which will become more apparent hereinafter are achieved by a glass pane for emergency exits or the like, characterized in that it comprises at least one first sheet that is provided with at least one hole and is joined to at least one second sheet that has no holes and is perimetrically shaped so that said first sheet is not mounted in the frame.

BRIEF DESCRIPTION OF THE DRAWINGS

Further characteristics and advantages of the invention will become apparent from the following detailed description of particular but not exclusive embodiments thereof, illustrated only by way of non-limitative example in the accompanying drawings, wherein.

DESCRIPTION OF THE PREFERRED EMBODIMENTS

Figure 1:
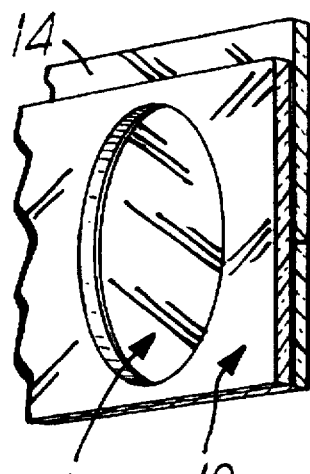
FIG. 1 is a perspective view of a detail of a first embodiment of the pane.
Figure 2:
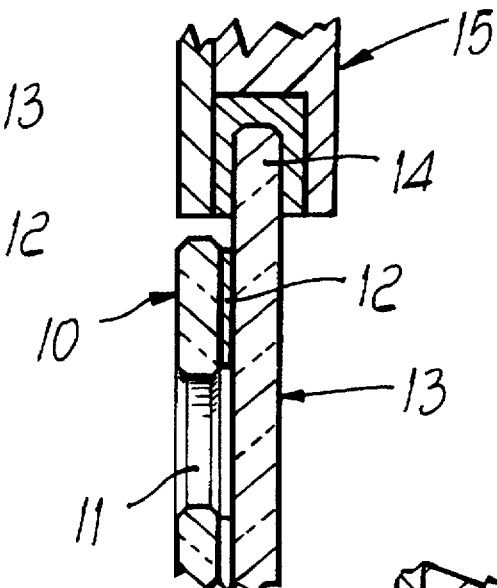
FIG. 2 is a sectional view of a detail of the pane of FIG. 1, mounted in a frame.

With reference to the above FIGS. 1 and 2, a pane according to the invention comprises, in a first embodiment, one or two first tempered sheets of glass 10 that are laminated together; at least one hole 11 is formed in said sheets and is located in any position.

The first sheets 10 are joined, by stratification of a plastic film 12, in the case being considered, to a second sheet 13 without holes which is indelibly tinted with a highly evident color (red, for example) at the holes 11 of the first sheets to clearly indicate the region where breakage should be produced, as will become apparent hereinafter.

The second sheet 13 is larger than the first sheets 10, so that its edge 14 protrudes therefrom and is the only edge that is mounted, in a per se known manner, in a perimetric frame, generally designated by the reference numeral 15.

The pane is mounted so that the second sheet 13 is on the outside.

Figure 3:
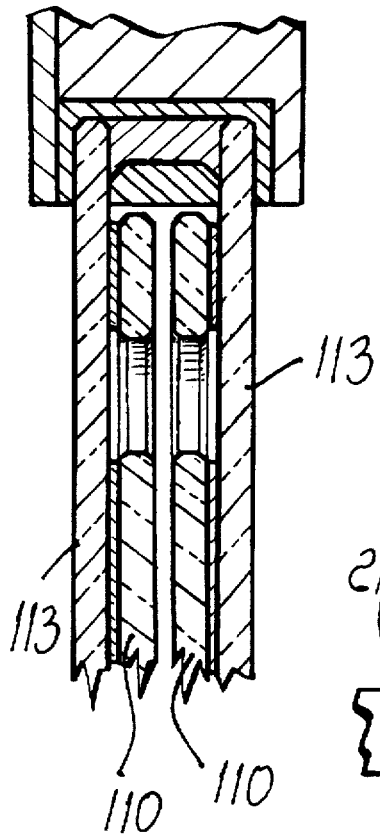
FIG. 3 is a sectional view of a detail of a second embodiment of the pane.

With reference to FIG. 3, a second embodiment is substantially constituted by two panes of the previous type that are arranged in a mirror-symmetrical manner with respect to each other, so that the first perforated sheets, now designated by the reference numeral 110, face each other and the second sheets 113 are on the outside.

Figure 4:
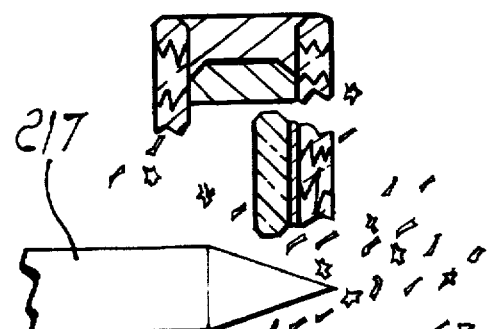
FIG. 4 is a sectional view of a detail of a third embodiment of the pane.

The embodiment of FIG. 4 instead associates a pane of the first embodiment with a monolithic sheet of tempered glass 216 that is placed on the side of the first perforated sheet, now designated by the reference numeral 210, so that it is spaced from said perforated sheet, and is mounted in the frame 215 like the second sheet 213.

Figure 5:
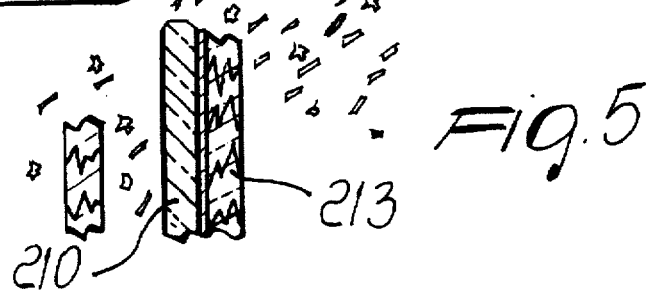
FIG. 5 is a sectional view of the action for breaking the pane in FIG. 4.

FIG. 5 clearly shows how the pane is broken by means of a pointed tool 217.

This is achieved by striking it at the region of one of the holes 11.

Since the sheets are made of tempered glass, as soon as the point of the tool 217 strikes them they break into fragments over their entire surface.

In the case of FIG. 5, the monolithic sheet 216 is entirely reduced to fragments, like the sheet 213.

The breakup in the latter sheet instantaneously eliminates the mounting conditions, allowing to knock down the entire pane with a limited effort (hand push, shoulder push, or kick), since it is no longer supported in any point.

It should also be stressed that the first sheet 210 of FIG. 5 is not normally affected by the blow of the tool 217 and therefore has a smooth, non-sharp surface when the user has to apply the thrust required to knock down the pane.

In practice it has been observed that the intended aim and objects of the present invention have been achieved.

Indeed, a pane has been provided which can be easily broken by acting on points that are straightforward to locate visually.

The pane is provided in such a manner that its mounting ceases to function as such when the glass is broken.

It is particularly suitable for windows of vehicles.

The invention thus conceived is susceptible of numerous modifications and variations, all of which are within the scope of the inventive concept.

Furthermore, all the details may be replaced with other technically equivalent elements.

In practice, the materials employed, so long as they are compatible with the contingent use, as well as the dimensions, may be any according to the requirements.

What is claimed is:

1. Glass pane for emergency exits comprising:
    at least one first sheet that is provided with a hole extending through the first sheet;

at least one second sheet that is perimetrically shaped and is joined to said first sheet such that a non-perforated area of said second sheet is arranged at said hole of said first sheet and said non-perforated area is accessable with a striking tool through said hole of the first sheet for breaking said second sheet; and a perimetric frame to which said second sheet is mounted such that a perimetric edge of said second sheet is mounted to said perimetric frame; and wherein said first sheet is not mounted to said perimetric frame but is joined only to said second sheet whereby breakage of said second sheet by means of the striking tool engaging the second sheet through said hole in the first sheet provides easy dismounting of the second sheet from said perimetric frame.

2. Pane according to claim 1, wherein said at least one first sheet is joined to said at least one second sheet by plastic film stratification by means of a plastic film disposed between the first sheet and the second sheet which directly joins the first sheet with the second sheet.

3. Glass pane according to claim 1, wherein said at least one second sheet is larger than said at least one first sheet for permitting only the second sheet and not the first sheet to be perimetrically mounted in said frame.

4. Glass pane according to claim 1, said non-perforated area having an evident marking with one or more of indelible tinting and screen-printing.

5. Glass pane according to claim 4, wherein said at least one second sheet is made of tempered glass.

6. Glass pane according to claim 1, wherein said at least one first sheet is made of tempered glass.

7. Pane according to claim 1, comprising two first tempered and laminated sheets each having at least one hole and each joined by stratification of a plastic film to a respective second tempered sheet that is larger than a respective one of said two first sheets so that only each second sheet is mounted in the frame with a respective perimetric edge thereof.

8. Glass pane according to claim 7, wherein two panes constituted by said sheets are arranged in a mirror-symmetrical manner with respect to each other, so that said first sheets face each other, and so as to form an insulating window.

9. Glass pane according to claim 1, further comprising a monolithic tempered glass pane mounted to said perimetric frame and spaced from said first and second sheets so as to form an insulating window.

* * * * *